United States Patent [19]

Honegger

[11] 4,034,845

[45] July 12, 1977

[54] APPARATUS FOR STACKING PRINTED PRODUCTS CONTINUOUSLY ARRIVING FROM CONVEYOR MEANS, ESPECIALLY PRODUCTS ARRIVING IN AN IMBRICATED FORMATION

[75] Inventor: Werner Honegger, Ruti, Switzerland

[73] Assignee: Ferag AG, Hinwil, Switzerland

[21] Appl. No.: 617,932

[22] Filed: Sept. 29, 1975

[30] Foreign Application Priority Data

Oct. 7, 1974 Sweden .............................. 7413409

[51] Int. Cl.² .................. B65G 47/00; B65H 29/02; B65H 31/22; B65H 33/16

[52] U.S. Cl. ................................. 198/418; 53/196; 93/93 R; 198/472; 198/473; 198/648; 198/650; 198/678; 206/593; 214/7; 271/63; 271/69; 271/85; 271/174; 271/177; 271/185; 271/204; 271/207

[58] Field of Search .......... 271/204, 205, 206, 207, 271/185, 184, 174, 177, 178, 179, 82, 85, 63, 69, 214, 216; 198/180, 133, 134, 20 R, 418, 472, 473, 646, 648, 649, 650, 678; 214/7; 206/73; 93/93 R; 53/196

[56] References Cited

U.S. PATENT DOCUMENTS

| | | | |
|---|---|---|---|
| 2,355,697 | 8/1944 | Belluche | 271/204 X |
| 3,019,886 | 2/1962 | Winkler et al. | 198/134 |
| 3,087,646 | 4/1963 | Ruby | 206/73 X |
| 3,112,032 | 11/1963 | Riecke | 206/73 |
| 3,174,749 | 3/1965 | Childs | 271/204 |
| 3,591,171 | 7/1971 | Schmidt | 271/185 |

*Primary Examiner*—Bruce H. Stoner, Jr.
*Attorney, Agent, or Firm*—Werner W. Kleeman

[57] ABSTRACT

An apparatus for stacking printed products or the like continuously arriving from a conveyor and moving along a conveying path of travel, especially printed products arriving in an imbricated product formation, wherein there are provided a plurality of clamping elements elastically pre-biased towards one another. The clamping elements are displaceably guided through the operable zone of a driven spreader mechanism and due to the action thereof temporarily brought out of their mutual clamping position. The path of movement of the clamping elements at the region of the spreader mechanism penetrates or passes through the path of travel for the incoming or arriving printed products defined by the conveyor.

28 Claims, 10 Drawing Figures

APPARATUS FOR STACKING PRINTED PRODUCTS CONTINUOUSLY ARRIVING FROM CONVEYOR MEANS, ESPECIALLY PRODUCTS ARRIVING IN AN IMBRICATED FORMATION

BACKGROUND OF THE INVENTION

The present invention relates to a new and improved construction of apparatus for stacking printed products or the like continuously arriving upon conveyor means or a conveyor track, especially products arriving or delivered in an imbricated or fish-scale product formation.

It is to be understood that in the context of this disclosure the term "fish-scale" formation or arrangement or equivalent terminology, as employed in conjunction with the handled articles, typically printed products, is intended to mean an arrangement of normally flat structures which are disposed in an overlapping spread stacked formation, in other words, in the manner of a fanned deck of cards. Also the term "printed products" is used in its broader sense as relating to various types of structures capable of being handled by the stacking apparatus of the invention, there being specifically mentioned, by way of example and not limitation, newspapers, periodicals, magazines and so forth.

Continuing, it is to be mentioned that the product stacks delivered by prior art stacking apparatuses of the aforementioned general type are relatively unstable structures which, in the event the formed stack is to be further transported, must be handled with extreme care or, however, must be held together with the aid of additional means.

One example of such additional means is conventionally employed tying or binding material. Apart from the fact that a processing or handling technique relying upon a tying operation requires an additional working step which must be carried out upon an additional piece of equipment or apparatus, the tying operation itself is associated with the danger that the edges of the uppermost and lowermost printed products of the stack might become damaged, and furthermore, there should not be overlooked the additional danger of permanent deformation of the products or articles constituting the stack.

Hence, it has therefore already been proposed in this particular field of technology to stack the printed products or articles in a type of stacking cartridge or container. These cartridges or containers can be compared to stacking chutes which can be exchangeably or detachably connected to the apparatus and at the same time serve as a transparent device for the product stack confined therein.

Admittedly the handling of a stack is simplified and the danger of damaging individual copies of the stack is equally diminished or eliminated to a certain extent if the products are stacked in cartridges or containers. But it must be appreciated that such cartridges or containers require a comparatively large amount of space, irrespective of whether they are filled or empty. Moreover, with the stacking of printed products in cartridges or containers as above mentioned, difficulties can arise in the sense that the printed products only can be again removed from the cartridges or containers in a certain sequence. For instance, it is not possible to subdivide the stack into packs or various groups within the cartridge or the like, for instance by removing or displacing a printed product serving to mark or indicate the end of such a pack or group. Additionally, the individual printed products within a cartridge or a container right from the start are not correlated with a clearly defined space or place, so that if the cartridge or container is incompletely filled, such hardly, but in any event only to an unsufficient degree, can fulfill its actual function as additional holding means.

SUMMARY OF THE INVENTION

Hence, it is a primary object of the present invention to provide a new and improved construction of stacking apparatus for articles or products which is not associated with the aforementioned drawbacks and limitations of the prior art proposals.

It is another and more specific object of the present invention to provide a new and improved construction of apparatus of the previously mentioned type, by means of which a stack is formed in or with the aid of an additional holding means, respectively, but the aforementioned drawbacks are extensively eliminated.

Now in order to implement these and still further objects of the invention, which will become more readily apparent as the description proceeds, the proposed apparatus of this development is manifested by the features that there are provided a multiplicity of clamping elements which are elastically prebiased or pre-tensioned towards one another. The conveyor means defines a conveying path of travel for the infed or arriving stream of products. The clamping elements are movably guided in succession through the operative or operable zone of a driven spreader mechanism and by virtue of the action of the latter are temporarily brought out of their mutual clamping position. Moreover, the path of movement of the clamping elements piercingly extends through the path of travel of the conveyor track or conveyor means for the infed printed products at the region of the spreader mechanism.

According to an advantageous physical manifestation of the invention, the clamping elements are formed by a part of the members or elements of an elongated, multi-element, resilient member, such as a spring element which is elastically elongatable in its lengthwise direction. This spring element can be wound or coiled in a spiral or helical configuration and the coils thereof form the individual clamping elements, or the resilient or spring element can be constituted by a package of blade or leaf springs connected with one another at their ends. The resilient or spring element is advantageously subdivided into individual sections which are separated from one another, which is the same as if the clamping elements were grouped together into individual sets which are independent of one another.

The spreader mechanism or separator means can be constituted, for instance, by at least one driven worm, the threads or helices of which engage into the path of movement of the clamping elements, the lengthwise axis of the worm being essentially in parallelism with such path of movement.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE INVENTION

Figure 1:
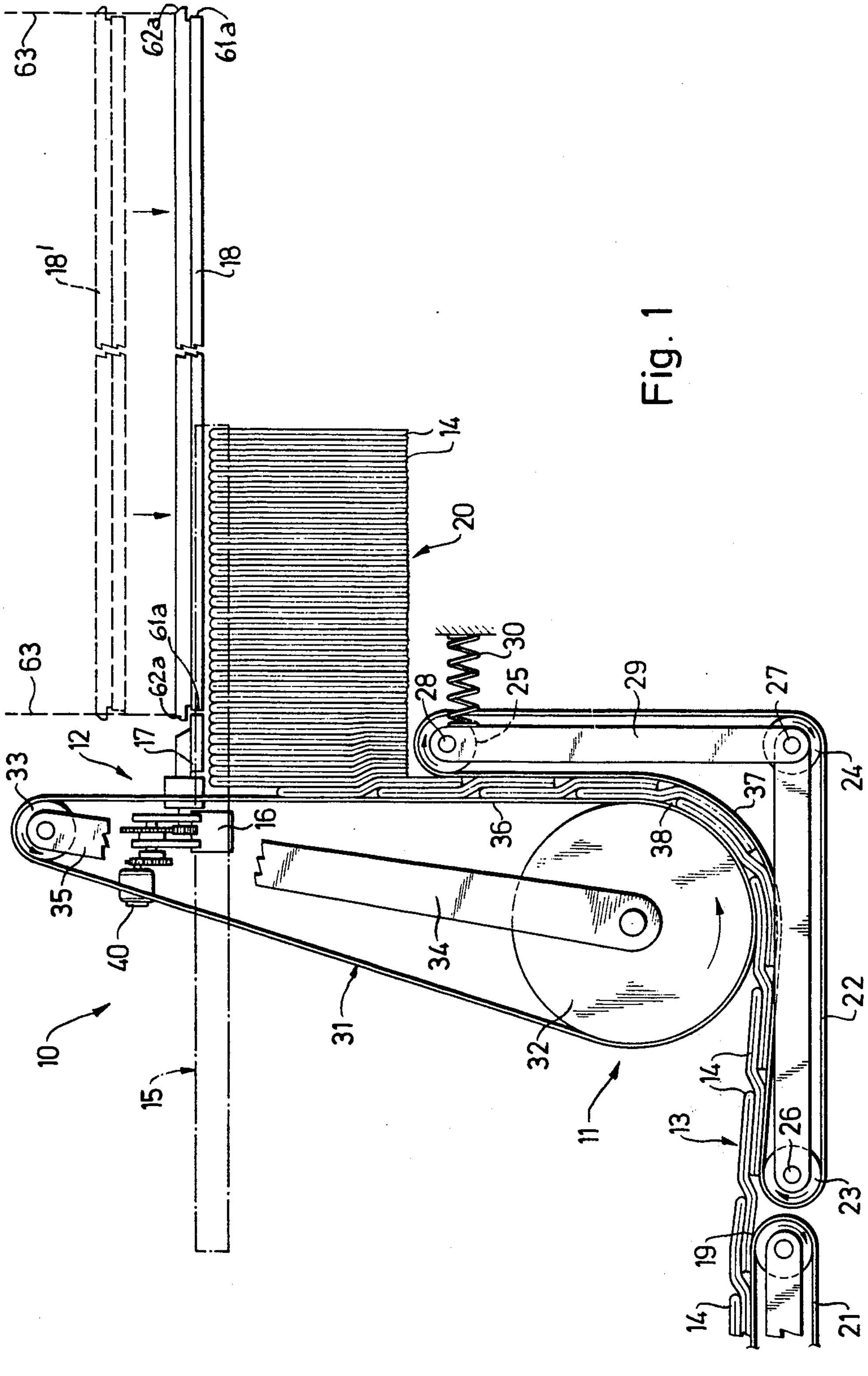
FIG. 1 is a schematic side view of an apparatus for stacking printed products, here shown by way of example as newspapers, arriving in an imbricated product formation, there only being portrayed for the sake of clarity in illustration the essential components of the apparatus.

Describing now the drawings, the stacking apparatus depicted by way of example in FIG. 1 has been generally designated in its entirety by reference character 10. This apparatus 10 comprises a conveyor means or conveyor track 11 or equivalent structure constituted by elements or components to be described more fully hereinafter and defining a path of travel for the delivery of an imbricated stream of products 13, which products, by way of example and not limitation, are here assumed to be newspapers 14. In FIG. 1 there will be additionally recognized a driven spreader means or separating mechanism 12 where the clamp elements or clamping elements, such as the clamping elements 15′ (FIG. 2) grouped together into a lengthwise elongated resilient member, such as the spring element or member generally indicated by reference character 15 are spread apart and at the same time forwardly displaced in lengthwise guides or guide members 16, 17 and 18, for example constituted by hollow rails, so that they penetrate into or pass through the conveyor means or track 11 and the path of travel for the product stream 13 formed thereby. At the region of the spreader mechanism or means 12 the individual newspapers 14 are thus inserted or shoved between the spread apart clamping or clamp elements 15′ and thereafter fixedly held thereby as soon as such clamping elements have again departed from the spreader mechanism 12. Due to the positive continual advancement of successive clamp elements 15′ the thus formed stack 20 is so-to-speak suspendingly advanced at the guide or guide means 18 until it has reaches the desired size.

The conveyor means or conveyor track 11 is directly arranged following the discharge end 19 of a driven conveyor device 21. This conveyor means or conveyor track 11 will be seen to comprise, by way of example, a first conveyor belt or band 22 which is trained about the rollers or rolls 23, 24 and 25. The rollers 23 and 24 are rotatably mounted upon the shafts or axles 26 and 27 which as a general rule are stationary, whereas the roller 25 is rotatably mounted upon the shaft or axle 28 which in turn is arranged at the free end of a rocker member or balance 29 pivotable about the shaft 27. The free end of this pivotable rocker 29 is pre-biased in the direction of a further driven band conveyor 31 or the like with the aid of a spring 30 or equivalent structure. The revolving path of travel of the band conveyor 31 is defined by a set of large deflecting rollers 32 and a set of smaller deflecting rollers 33, each of which are mounted at the end of a cantilever member or arm 34 and 35 respectively. The run 36 of the band conveyor 31 coming off of the large deflecting or deflection rollers 32 together with the run 37 of the conveyor band or belt 22 coming off of the roller 23 and running onto the roller 25 forms a conveyor channel 38 in which the incoming or arriving imbricated product stream 13 is somewhat compressed together and deflected vertically upwardly. The run 36 of the band conveyor 31 extends past the discharge or outfeed end of the conveyor channel 38 and thereby forms a vertical conveyor track or path which possesses a vertically upwards effective conveying action which is penetrated by the spreader mechanism 12 and the path of movement of the clamping elements which will still be described in detail hereinafter, and which path of movement is determined by the guides or guide members 16, 17 and 18.

Figure 2:
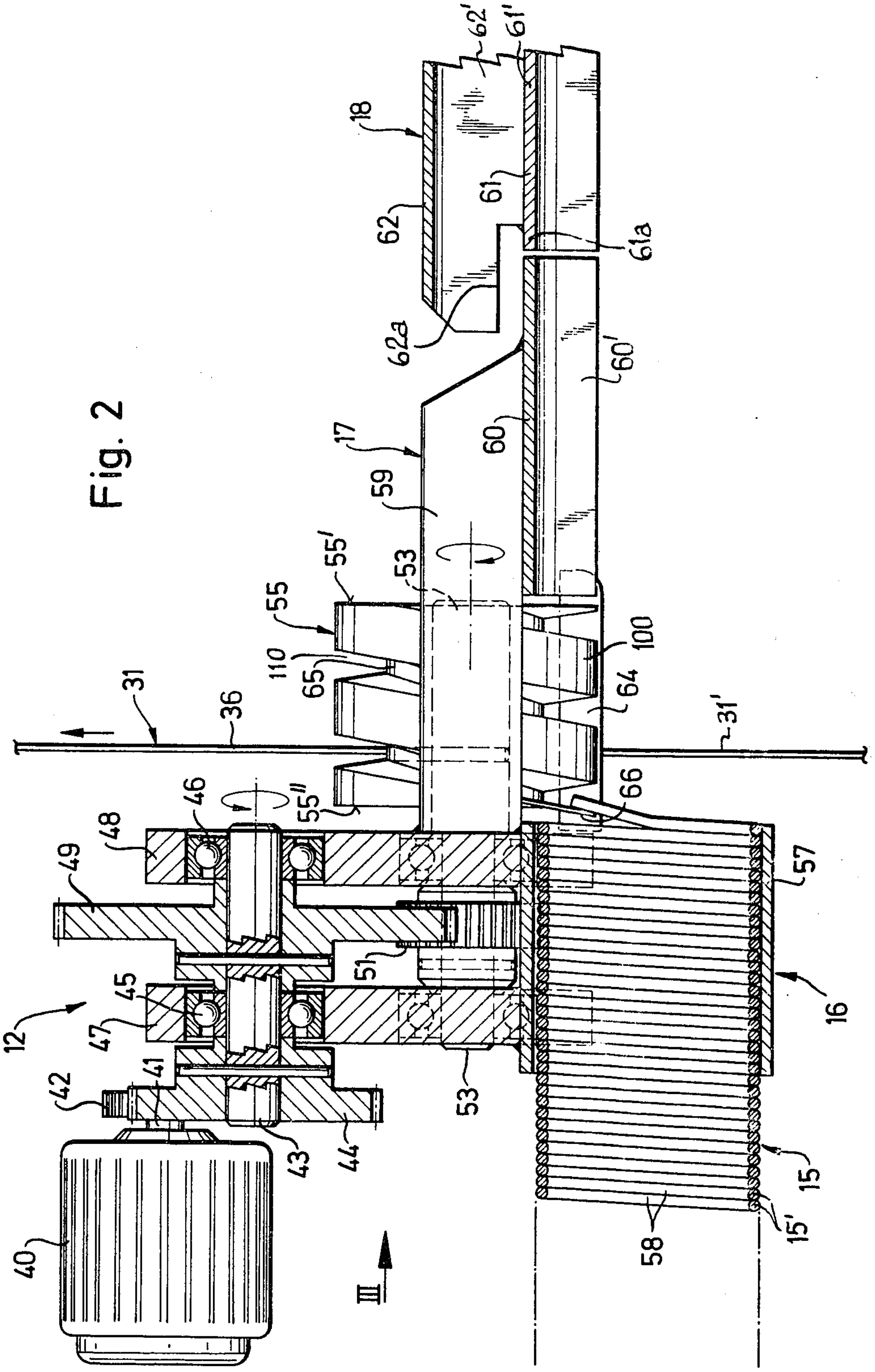
FIG. 2 is a sectional view of an enlarged scale of the spreader or separator mechanism for the clamping elements, taken substantially along the line II—II of FIG. 3.
Figure 3:
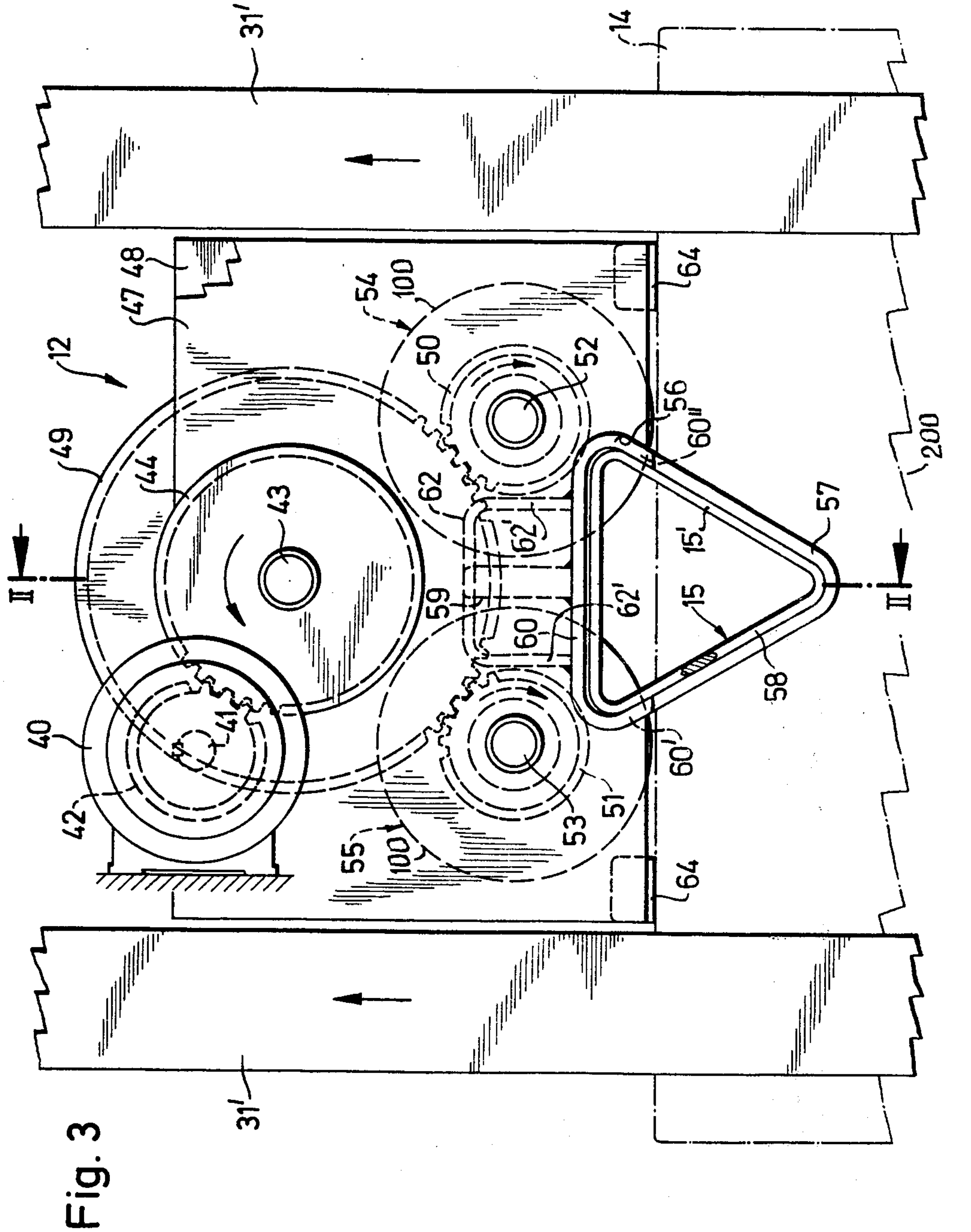
FIG. 3 is an end view of the spreader mechanism or means of FIG. 2 as the same appears when essentially looking in the direction of the arrow III of FIG. 2.

Turning attention to FIGS. 2 and 3 there will be seen that the run 36 of the band or belt conveyor 31 possesses two small spaced apart bands or belts 31′ revolving in the same direction. In the intermediate space 200 between both of the bands 31′ there is arranged the spreader means or mechanism 12. This spreader mechanism 12 is driven by a suitable motor 40 or equivalent drive. Upon the drive or power take-off shaft 41 of the motor 40 there is keyed or otherwise suitably attached a pinion 42, as best seen by referring to FIG. 3. Pinion 42 meshes with a gear 44 seated upon an intermediate shaft or transmission shaft 43. The shaft 43 is rotatably mounted in ball bearings 45 and 46 or the like between two side or check plates 47 and 48 respectively. These side plates 47 and 48 so-to-speak form a stationary frame for the spreader mechanism 12. Upon the intermediate or transmission shaft 43 there is furthermore keyed or otherwise suitably secured an additional gear 49 which, in turn, is in meshing engagement with two gears 50 and 51 of the same size, as best seen by referring to FIG. 3. Both the gear 50 as well as also the gear 51 are each keyed or otherwise appropriately secured to a respective shaft 52 and 53 which, in turn, are rotatably mounted in the side plates 47 and 48 just as was the case for the transmission or gearing shaft 43. Both the shaft 52 and the shaft 53 extend past the side plate 48 and carry at their respective protruding portion a respective worm 54 and 55 or equivalent structure possessing trapezoidal threading or acme screw threads 100. From what has been discussed above it should be apparent that both of the worms 54 and 55 positively rotate in the same sense or direction and with the same rotational speed as soon as motor 40 is turned-on.

In cut-outs or recesses 56 at the lower edge of both side plates 47 and 48 there is secured a part of a guide tube or pipe 57 having a profile or cross-sectional configuration which essentially exhibits the shape of an equilaterial triangle with rounded edges. This guide tube 57 serves for the reception and guiding of the resilient or spring member 15, which, as best seen by referring to FIGS. 2 and 3, possesses the shape of a "helical or coil spring" wound about a triple-edge mandrel or core having rounded edges. The individual coils or windings 58 of the spring element or member 15 form the clamping or clamp elements 15′ discussed above at their lower region, these clamp elements 15′ being resiliently pre-biased towards one another.

At the side of the side plate 48 opposite to or facing away from the side plate 47 and between both of the worms 54 and 55 there is attached a cantilever or overhang member 59 extending past the length of the worms 54 and 55. At the lower edge of the portion of the cantilever 59 extending past the worms 54 and 55 there is secured a downwardly open hollow rail 60 possessing inwardly flexed legs or leg members 60' and 60'' having an inner profile or shape which is identical to and aligned with a part of the inner shape or profile of the guide tube 57. In this way there is insured that the spring element 15 after passing the worms 54 and 55 enters the hollow rail 60 in the manner of a curtain guide or runner. After the hollow rail or rail member 60 and in alignment therewith is a similarly formed further hollow rail or rail member 61 which is secured to a support or carrier 62. As shown in broken or phantom lines in FIG. 3 the support 62 possesses a downwardly directed or downwardly open substantially U-shaped profile or configuration, the ends of the legs 62' of this U-shaped profile being attached to the outer side of the web 61' of the hollow rail 61. The ends 62*a* of the support 62, as best seen by referring to FIGS. 1 and 2 are undercut, so that they extend past the ends 61*a* of the hollow rail 61. The hollow rail 61 together with the support or carrier 62 form the guide means 18 already discussed previously in conjunction with FIG. 1.

The described apparatus 10 preferably possesses an assembly or set containing a plurality of hollow rails 61 and supports or carriers 62 which can be brought in succession, for instance by means of a stepwise operating conveyor, into a position where a hollow rail 61 is in alignment with the hollow rail 60. This has been conveniently schematically indicated in FIG. 1 by reference character 18' and by means of a drag or tow conveyor indicated by reference character 63. With this arrrangement it is possible, as soon as a first hollow rail 61 is occupied by a spring element 15 with clamped printed products, to bring into position, from out of such set or assembly, a further hollow rail 61 with its support 62 in order to take up one or a number of successively filled or loaded spring elements. A "loaded" or "filled" hollow rail 61 is thus capable of being compared to a curtain rail or railing wherein the coils or windings of the spring element or member 15 form the slide means, wherein conceptually the stack 20 is "suspended" at the slide means or runners in the form of the curtain.

Moreover, at the side or face of the side plate 48 directed away from the side plate 47 there are attached two impact or stop rails 64 which extend over the entire length of the worms 54 and 55 and thus piercingly extend through the plane formed by the run 36 of the band conveyor 31 or the like at the region of the worms 54 and 55. These impact rails 64 serve the purpose, as will be more fully explained hereinafter, of stopping the printed products 14 arriving at the band conveyor 31 by hitting or impacting such products at their leading edges (fold) and thus prevent a penetration thereof between the threads of the worms 54 and 55.

The front or end surfaces of the worms 54 and 55 are of flat configuration as such has been indicated in FIG. 2 by reference characters 55' and 55''. This has the result that the threads 100 of worms, 54, 55 at the region of the front or end surfaces run out in the manner of blades which emanate from the core 65 of the worms and while extending through a curved course of travel finally reach their external diameter. Such a blade has been indicated in FIG. 2 with reference character 66. The end surface 55'' of the worm 55 and which confronts the guide tube 57 as well as the corresponding end surface of the worm 54 thus form stops for the spring element arriving out of the guide tube 57, and during each revolution of the worm the leading "blade" or "knife" 66 so-to-speak "cuts" the next coil or winding of the spring element or member and positively engages into the helically shaped groove 110 between the threads 100 of the worm. Since the pitch of the worms 54 and 55 is considerably greater than the pitch of the (non-expanded or non-stretched) spring element 15 there is realized the result that the spring element, during passage through the associated worm or worms will be uniformly stretched winding for winding until it so-to-speak "departs" out of the worm 55 at the region of the end surface 55' thereof and the corresponding end surface of the other worm 54.

With the illustrated exemplary embodiment both of the worms 54, 55 possess the same rotational sense or direction, and specifically with the showing of FIG. 3 these worms rotate in clockwise direction. Hence, both of the worms 54 and 55 are left-hand thread worms. If the worms 54 and 55 are driven in the opposite rotational sense, then of course the worms 54 and 55 would be constructed to possess right-hand threading, since both worms act upon the spring element in the manner of a conveying worm. It is of advantage to select the coiling or winding direction of the coils of the spring element 15 opposite to the threading or threads 100 of the worms 54 and 55 typically for instance in the case of a left-hand threaded worm to use a right-hand wound spring element or member 15. Further, one worm can possess right-hand threads, the other left-hand threads, in which case both worms are then driven in opposite rotation sense or direction.

Figure 4:
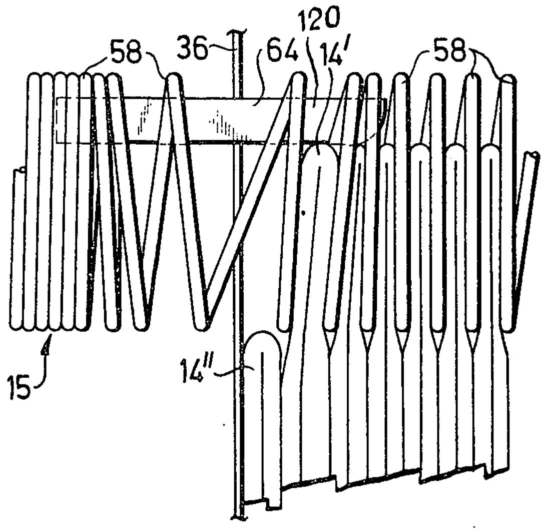
FIGS. 4, 5 and 6 respectively illustrate different phases or steps of the stacking operation, i.e., the introduction of the individual printed products between the spread apart clamping elements.
Figure 5:
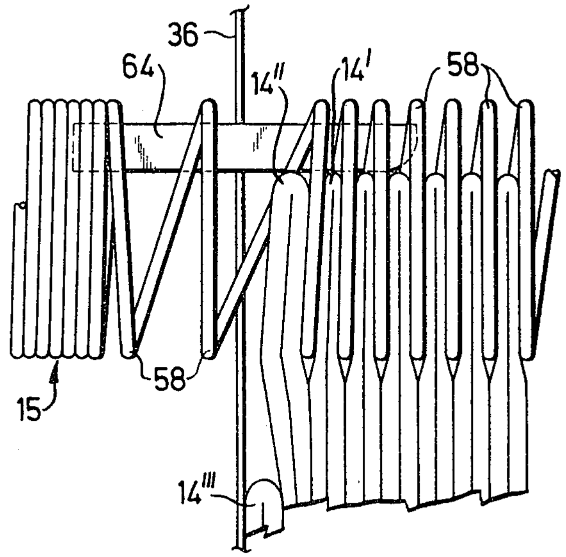
Figure 6:
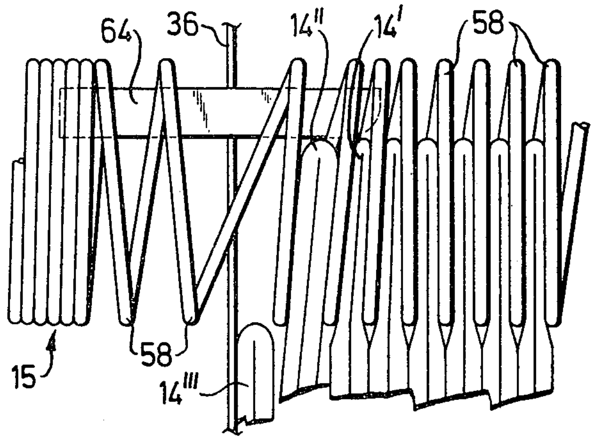

In order to appreciate the operation of the illustrated apparatus attention is directed to the showing of FIGS. 4, 5 and 6. There will be recognized therein the conveying-active run 36 of the band conveyor 31 (also referred to in the art as a conveyor band or belt), the impact or stop rail 64 and the spring element or member 15 which is just in the process of passing by means of one of its section or portions the worms 54 and 55 which have not here been shown in order to preserve clarity in illustration. In FIG. 4 the fold of the printed product 14'' trailing the printed product 14' is in the process of being displaced from below into the intermediate space 120 opened by the worms 54 and 55 between two successive coils or windings 58 of the spring element 15, due to the combined action or effect of the conveying-active run 36 and the trailing printed products which are still exposed to the action of the run 37 of the conveyor band or belt 22. This feed movement or advancing movement terminates as soon as the leading fold of the printed product 14'' strikes against the impact rail 64. This condition has been illustrated in FIG. 5 where there has been also shown the leading edge of the printed product 14''' following the printed product 14''. Although this printed product 14''' lifts the leading printed product 14'' from the conveying-active run 36 of the conveyor means, due to its own movement it however prevents that such printed product 14'' which is inserted more or less loosely into the spread apart winding or coil of the spring element 15 and hitting against the impact rail 64 will slide away downwards.

Shortly thereafter the resilient or spring element 15 departs from the worms and due to the inherent elasticity or resiliency of such spring element the coils or windings 58 thereof have the tendency to collapse or come together as closely as possible. Consequently, the printed product 14'' is fixedly clamped and prevented from sliding out of the spring element. During this time the trailing printed product 14''' has been forwardly shifted to such an extent that there is again attained a position which can be compared to that shown in FIG. 4. These operations are repetitive as long as the printed products keep arriving and as long as the spring element 15, which in turn can be subdivided into individual sections or portions, has not completely passes through or moved past the worms 54 and 55. The resilient element or spring 15 loaded or filled with the printed products is initially further displaced into the hollow rail 60 and thereafter into the therewith merging and aligned hollow rail 61 until the entire stack is suspended in the hollow rail 61. It is to be appreciated that by virtue of the use of the spring element 15 each single copy of the newspapers 14 is fixedly clamped in its position and that it is possible to individually remove the newspaper copies 14 out of the stack 20 without diminishing or impairing the clamping action effective at the neighboring copies. Until further use of the stack formed in the apparatus it is possible for such to be transported in a simple manner and stored in a space-saving manner by means of the spring element 15, thus constituting a stack storage and holding means, and hanging by means of the support or carrier 61.

The destacking operation can be equally performed without great effort if there is conceptually considered that by bending-through the resilient or spring element 15 it is possible to spread apart the coils or windings thereof to such an extent from one another that the printed products 14 are again released.

Figure 7:
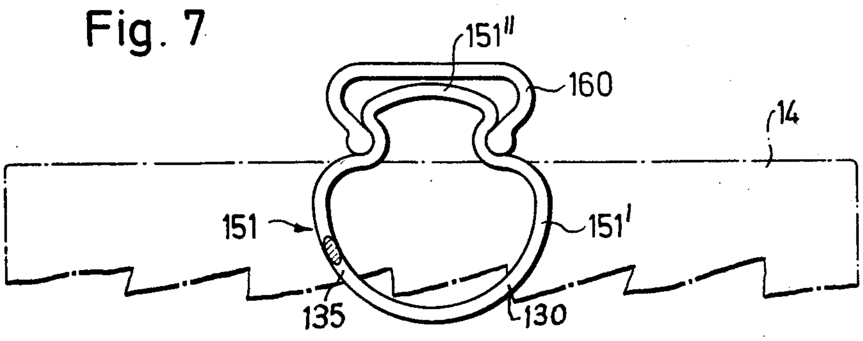
FIGS. 7, 8, 9 and 10 respectively illustrate different exemplary embodiments of clamping elements grouped together into resilient or spring members or elements.
Figure 8:
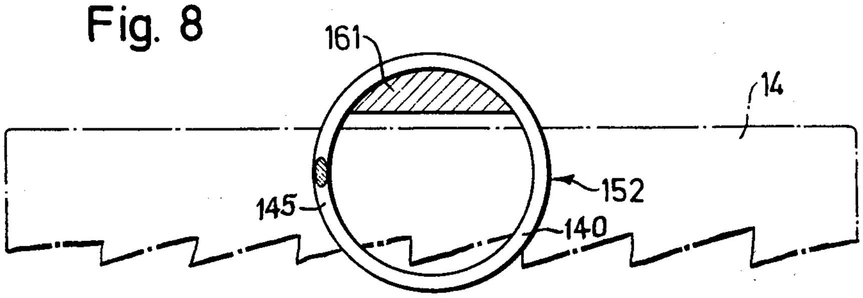

In FIGS. 7 to 10 there are illustrated schematically different exemplary embodiments of spring elements, comparable to the spring element 15 discussed above but of different construction, this term "spring element" or equivalent terminology being used broadly to designate structure having resilient or spring-like properties. The spring elements 151 and 152 of FIGS. 7 and 8 are wound to provide spring coils or windings 130 and 140, respectively defining the clamping elements 135 and 145 whereas the spring element 153 of FIGS. 9 and 10 practically consists of a pack of blade springs or leaf springs. While the spring 15 of FIGS. 1–6 possesses, for instance, an envelope approximating an essentially triangular prism, here the cross-sectional configuration of the core of the wound spring element 151 can be conveniently conceptually compared to the shape of a mushroom, the top or crown of which is downwardly directed, as indicated by reference character 151'. The part 151' of each of the spring coils or windings 130 and forming the outine of such mushroom head or crown essentially forms the clamp or clamping element, whereas the remaining part 151'' serves the purpose of resiliently interconnecting with one another the individual clamping elements and forming projections or protuberances into which engage the flexed-in or inwardly bent leg or a downwardly open U-shaped configured hollow rail 160. Also this type structured spring element 151' can be locally expanded or spread apart by one or two worms, as illustrated in FIG. 3.

The spring element 152 of the arrangement of FIG. 8 practically corresponds to a helical spring having coils or windings 140 which bear against or contact one another in the non-stretched condition thereof. Suitable for use with such spring element 152 is a support rail or carrier rail 161 engaging axially into the interior of said spring element, this support rail having a cross-sectional configuration corresponding to a sector of a circle.

Figure 9:
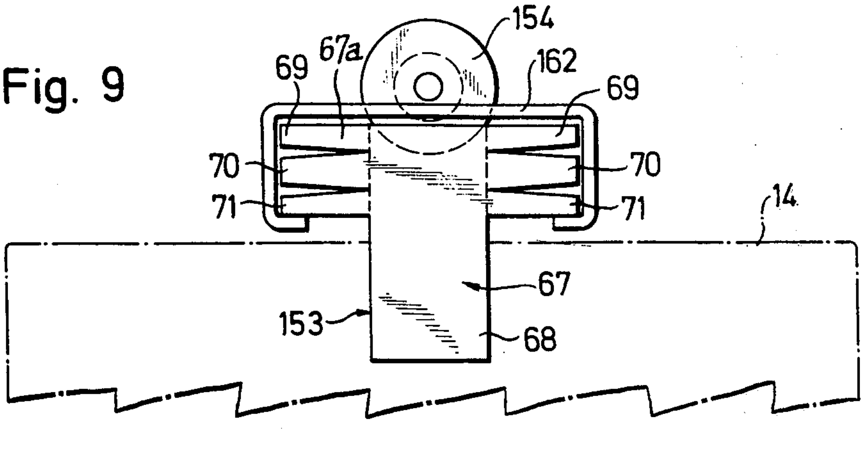
Figure 10:
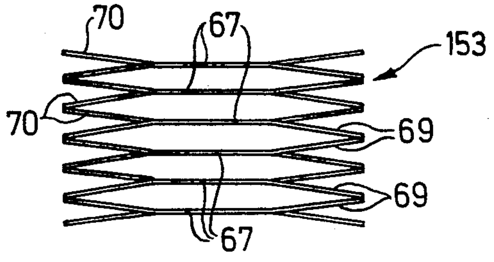

The spring element 153 of FIGS. 9 and 10 is essentially formed of a multiplicity of substantially T-shaped blade or leaf springs. The downwardly protruding leg 68 of each blade or leaf spring 67 forms one of the clamp or clamping elements of the spring element 153 whereas the ends of a beam portion or beam 67*a* of each blade spring 67 are slotted, so that such ends partake the shape of a fork having the tongs 69, 70 and 71. The free ends of the tongs 70 of each blade spring 67 are connected with the ends of the associated tongs of the spring directly neighboring at the one side, whereas the ends of the tongs 69 and 71 are connected with the ends of the corresponding or associated tongs of the blade spring immediately neighboring at the other side. In this way there is formed a coherent stack or a coherent pack or package of blade or leaf springs which can elongate in a direction extending transversely to the plane of the blade springs. This elongation or accordian-type action to which the blade or leaf spring package is exposed, as schematically indicated in FIG. 9, can be achieved with the aid of a single worm 154 or equivalent structure which engages by means of its threads between the individual blade springs 67 at the central region of its beam 67*a*. Consequently, the spring element 153 is stretched or elongated approximately in the manner shown in top plan view in FIG. 10, so that the legs or clamping elements 68 can be brought out of their mutual clamping position and the individual newspaper copies 14 can be introdued therebetween, as such has been indicated in phantom lines in FIG. 9. For the guiding and reception of a spring element 153 there can be used to advantage a substantially C-shaped support rail 162 with inwardly flexed or bent ends of the legs thereof.

While there are shown and described present preferred embodiments of the invention, it is to be distinctly understood that the invention is not limited thereto, but may be otherwise variously embodied and practiced within the scope of the following claims. Accordingly,

What is claimed is:

1. An apparatus for stacking products, such as printed products or the like continuously arriving from conveyor means, especially printed products arriving in an imbricated product formation, comprising conveyor means for the infeed of th products along a predetermined path of travel, a plurality of successive clamping elements structured to be elastically pre-biased towards one another, each successive one of said clamping elements clamping one of the products of the stack which is being formed, driven spreader mmeans, said clamping elements being movable from a product clamping position into a spread position, means for movably guiding said clamping elements along a path of movement and through an operable zone of said driven spreader means for coaction therewith in order that said clamping elements are temporarily brought out of their clamping position into their spread position, the path of movement of the clamping elements at the region of the spreader means passing through the path of travel of the conveyor means for the infeed of said products and including a support means arranged following said spreader means for receiving said plurality of clamping elements with the products clamped thereat, said plurality of clamping elements and support means comprising at least one product stack storage and holding means removable from a position adjacent the operable zone following clamping of the products thereat for the storage of the clamped stack of products.

2. An apparatus for stacking products, such as printed products or the like continuously arriving from conveyor means, especially printed products arriving in an imbricated product formation, comprising conveyor means for the infeed of the products along a predetermined path of travel, a plurality of clamping elements structured to be elastically pre-biased towards one another, driven spreader means, said clamping elements being movable from a product clamping position into a spread position, means for movably guiding said clamping elements along a path of movement and through an operable zone of said driven spreader means for coaction therewith in order that said clamping elements are temporarily brought out of their clamping position into their spread position, the path of movement of the clamping elements at the region of the spreader means passing through the path of travel of the conveyor means for the infeed of said products, and the clamping elements are constituted by part of the elements of a lengthwise extending, multi-element spring element which is elastically expansible in the lengthwise direction thereof.

3. The apparatus as defined in claim 2, wherein the spring element comprises wound structure having coils, parts of said coils defining said clamping elements.

4. The apparatus as defined in claim 3, wherein the wound spring element defines an envelope surface possessing a configuration essentially corresponding to a three-sided prism.

5. The apparatus as defined in claim 3, wherein the spreader means comprises at least one driven worm having threads at least partially extending into the path of movement of the clamping elements, said driven worm having a lengthwise extending axis which is essentially parallel to said path of movement of the clamping elements, and wherein the worm has a pitch direction of the threads thereof which is opposite to the direction of winding of the coils of the spring element.

6. The apparatus as defined in claim 2, wherein the spring element comprises a package of leaf springs having interconnected ends.

7. The apparatus as defined in claim 6, wherein the ends of the leaf springs are provided with slot means, the portions of the ends of each leaf spring located at one side of a slot means being connected with corresponding portions of the leaf springs neighboring said one side and the portions of the ends of the leaf spring located at the other side of a slot means being connected with the corresponding portions of the leaf springs neighboring the other side.

8. The apparatus as defined in claim 7, wherein the leaf springs possess as intermediate portion provided with a laterally protruding clamping element provided thereat.

9. The apparatus as defined in claim 2, wherein the spring element is subdivided into individual sections.

10. The apparatus as defined in claim 9, wherein the means for guiding the clamping elements incorporate guide means serving for the infeed of the sections of the spring element to the spreader means, an assembly of guide rails, and means for aligning each of said guide rails with the guide means serving for the infeed of the sections of the spring element to the spreader means.

11. An apparatus for stacking products, such as printed products or the like continuously arriving from conveyor means, especially printed products arriving in an imbricated product formation, comprising conveyor means for the infeed of the products along a predetermined path of travel, a plurality of clamping elements structured to be elastically pre-biased towards one another, driven spreader means, said clamping elements being movable from a product clamping position into a spead position, means for movably guiding said clamping elements along a path of movement and through an operable zone of said driven spreader means for coaction therewith in order that said clamping elements are temporarily brought out of their clamping position into their spread position, the path of movement of the clamping elements at the region of the spreader means passing through the path of travel of the conveyor means for the infeed of said products, said spreader means comprising at least one driven worm having threads engaging into the path of movement of the clamping elements, said driven worm having a lengthwise axis extending substantially parallel to the path of movement of the clamping elements.

12. An apparatus for stacking products, such as printed products or the like continuously arriving from conveyor means, especially printed products arriving in an imbricated product formation, comprising conveyor means for the infeed of the products along a predetermined path of travel, a plurality of clamping elements structured to be elastically pre-biased towards one another, driven spreader means, said clamping elements being movable from a product clamping position into a spread position, means for movably guiding said clamping elements along a path of movement and through an operable zone of said driven spreader means for coaction therewith in order that said clamping elements are temporarily brought out of their clamping position into their spread position, the path of movement of the clamping elements at the region of the spreader means passing through the path of travel of the conveyor means for the infeed of said products, the means for guiding the clamping elements along said path of movement comprises guide rails positioned in alignment with one another, at least one of the guide rails being arranged upstream of the spreader means with respect to the direction of movement of the products and the remaining guide rails being arranged downstream of the spreader means with respect to the direction of movement of the products.

13. The apparatus as defined in claim 12, wherein the clamping elements are formed by a part of the elements of a lengthwise extending, multi-element spring element which is resiliently expansible in the lengthwise direction thereof, said spring element being subdivided into individual sections, said remaining guide rails possessing a stationary rail section arranged following the spreader means and an assembly of further guide rails, and means for selectively aligning each one of said further guide rails with the stationary rail section and for again shifting such aligned guide rail out of such aligned position.

14. The apparatus as defined in claim 13, wherein the length of the further guide rails exceeds the length of a section of the spring element holding said products.

15. The apparatus as defined in claim 13, wherein the further guide rails are constituted by hollow rail members which partially engage about the clamping elements of the spring element.

16. The apparatus as defined in claim 11, wherein said worm has an end confronting the clamping elements, said worm end possessing a substantially flat configuration and forming stop means for a clamping element impacting thereagainst until such impacting clamping element is engaged by the worm as a function of the rotational position thereof.

17. The apparatus as defined in claim 1, wherein the conveyor means for the infeed of the products along said path of travel possesses two endless conveyor elements arranged at a lateral spacing from one another, said spreader means being located at the region of the spacing between said endless conveyor elements.

18. The apparatus as defined in claim 1, further including stop means arranged at said path of travel of the products at the region of the spreader means, said stop means serving to define a terminal position of the products in the direction of the infeed thereof.

19. An apparatus for stacking products, such as printed products or the like continuously arriving from conveyor means, especially printed products arriving in an imbricated product formation, comprising conveyor means for the infeed of the products along a predetermined path of travel, a plurality of clamping elements structured to be elastically pre-biased towards one another, driven spreader means, said clamping elements being movable from a product clamping position into a spread position, means for movably guiding said clamping elements along a path of movement and through an operable zone of said driven spreader means for coaction therewith in order that said clamping elements are temporarily brought out of their clamping position into their spread position, the path of movement of the clamping elements at the region of the spreader means passing through the path of travel of the conveyor means for the infeed of said products, the path of movement of the clamping elements is essentially horizontally directed at the region of the spreader means, and the conveyor means defining said path of travel for the products possesses a terminal section extending substantially vertically upwards.

20. The apparatus as defined in claim 19, wherein the substantially vertically upwardly extending terminal section of the conveyor means embodies a conveyor channel defined by two confronting runs of enedless conveyor elements.

21. The apparatus as defined in claim 11, including a second worm, said two worms being arranged at the same spacing from and to opposite sides of the path of movement of the clamping elements.

22. The apparatus as defined in claim 21, wherein both worms are left-hand worms which can be driven in the same direction of rotation.

23. The apparatus as defined in claim 2, wherein the conveyor means for the infeed of the products along said path of travel possesses two endless conveyor elements arranged at a lateral spacing from one another, said spreader means being located at the region of the spacing between said endless conveyor elements.

24. The apparatus as defined in claim 2, further including stop means arranged at said path of travel of the products at the region of the spreader means, said stop means serving to define a terminal position of the products in the direction of the infeed thereof.

25. The apparatus as defined in claim 11, wherein the conveyor means for the infeed of the products along said path of travel possesses two endless conveyor elements arranged at a lateral spacing from one another, said spreader means being located at the region of the spacing between said endless conveyor elements.

26. The apparatus as defined in claim 11, further including stop means arranged at said path of travel of the products at the region of the spreader means, said stop means serving to define a terminal position of the products in the direction of the infeed thereof.

27. The apparatus as defined in claim 19, wherein the conveyor means for the infeed of the products along said path of travel possesses two endless conveyor elements arranged at a lateral spacing fron one another, said spreader means being located at the region of the spacing between said endless conveyor elements.

28. The apparatus as defined in claim 19, further including stop means arranged at said path of travel of the products at the region of the spreader means, said stop means serving to define a terminal position of the products in the direction of the infeed thereof.

* * * * *